United States Patent
Kawami et al.

(10) Patent No.: US 8,460,515 B2
(45) Date of Patent: Jun. 11, 2013

(54) BIOCOKE PRODUCING APPARATUS AND PROCESS THEREFOR

(75) Inventors: Yoshimasa Kawami, Kanagawa (JP); Jun Satou, Kanagawa (JP); Tamio Ida, Osaka (JP)

(73) Assignees: Naniwa Roki Co., Ltd., Osaka (JP); Kinki University, Osaka (JP)

( * ) Notice: Subject to any disclaimer, the term of this patent is extended or adjusted under 35 U.S.C. 154(b) by 808 days.

(21) Appl. No.: 12/597,662

(22) PCT Filed: Apr. 22, 2008

(86) PCT No.: PCT/JP2008/058226
§ 371 (c)(1),
(2), (4) Date: Jan. 26, 2010

(87) PCT Pub. No.: WO2008/136475
PCT Pub. Date: Nov. 13, 2008

(65) Prior Publication Data
US 2010/0162618 A1   Jul. 1, 2010

(30) Foreign Application Priority Data

Apr. 27, 2007  (JP) ................. 2007-119268

(51) Int. Cl.
*C10B 45/02* (2006.01)
*C10L 5/06* (2006.01)
*C10L 5/02* (2006.01)

(52) U.S. Cl.
CPC ...................... *C10L 5/02* (2013.01)
USPC .......... 201/5; 201/7; 201/8; 201/35; 202/113; 202/117; 202/118; 202/248; 44/589; 44/593; 44/595; 44/597

(58) Field of Classification Search
CPC ..... C10G 2300/1011; C10L 5/02; C10L 5/447; C10L 2290/02; C10B 53/02
USPC ................. 202/113, 117, 118, 248; 585/242; 201/5, 7, 8, 35; 44/589, 590, 591, 592, 593, 44/595, 597
See application file for complete search history.

(56) References Cited

U.S. PATENT DOCUMENTS 3,619,376 A * 11/1971 Patel et al. ................ 201/6
4,015,951 A    4/1977 Gunnerman
(Continued)

FOREIGN PATENT DOCUMENTS

JP       61-27435    8/1977
JP       59-062401   4/1984
(Continued)

OTHER PUBLICATIONS

Machine Translation JP2003206490.*
(Continued)

*Primary Examiner* — Nina Bhat
(74) *Attorney, Agent, or Firm* — Wenderoth, Lind & Ponack, L.L.P.

(57) ABSTRACT

A biocoke producing apparatus has a reaction vessel that has a preset temperature range and pressure range for, without carbonizing of the pulverized biomass, inducing a pyrolytic or thermal curing reaction of lignin and hemicellulose thereof. The reaction vessel has a pressurization device for pressurizing to the pressure range, a heating device for heating to the temperature range in the state of the pressurization and a cooling device for cooling after maintaining of the above state. Multiple reaction vessels are provided. A pulverization delivery conveyor is provided superior to these reaction vessels, and each of the multiple reaction vessels is connected via a connection tube to the conveyor. The connection tube is provided with a pulverizate charging device for charging a given amount of pulverized biomass in accordance with a timing of pulverizate charging to the reaction vessels.

8 Claims, 6 Drawing Sheets

U.S. PATENT DOCUMENTS

| | | | |
|---|---|---|---|
| 6,905,644 B1 * | 6/2005 | Muller et al. | 264/108 |
| 8,211,274 B2 * | 7/2012 | Ida et al. | 201/5 |
| 2008/0051614 A1 | 2/2008 | Ida et al. | |
| 2010/0288618 A1 * | 11/2010 | Feerer et al. | 202/118 |

FOREIGN PATENT DOCUMENTS

| | | | |
|---|---|---|---|
| JP | 11-226540 | | 8/1999 |
| JP | 2001-124790 | | 5/2001 |
| JP | 2003-206490 | | 7/2003 |
| JP | 2003-213273 | | 7/2003 |
| JP | 2003-213280 | | 7/2003 |
| JP | 2003206490 | * | 7/2003 |
| JP | 2004-43517 | | 2/2004 |
| JP | 2005126573 | * | 5/2005 |
| WO | 2006/078023 | | 7/2006 |

OTHER PUBLICATIONS

Machine Translation JP 2004-43517.*

Japanese Office Action issued Aug. 14, 2012 in corresponding Japanese Patent Application No. 2007-119268 with English translation.

International Search Report dated Jun. 17, 2008 for International Application No. PCT/JP2008/058226.

Satoru Mizuno et al., "Making of alternative coal coke by biomass based on photosynthesis", Dai 44 Kai Proceedings of the Japanese Symposium on Combustion, 2006, pp. 294, 295 and 560.

* cited by examiner

|  | Wood biomass (in raw) | Coal coke | Biocoke |
|---|---|---|---|
| Maximum compressive strength (MPa) | 30 | 15 to 20 | 60 to 200 |
| Heat value (MJ / kg) | 17 | 29 | 18 to 23 |
| Apparent specific gravity | 0.4 to 0.6 | 1.85 | 1.2 to 1.38 |

BIOCOKE PRODUCING APPARATUS AND PROCESS THEREFOR

This application is a national stage application of International application PCT/W2008/058226, filed Apr. 22, 2008, the entire disclosure of which is incorporated herein by reference.

BACKGROUND OF THE INVENTION

1. Field of the Invention

The present invention generally relates to the field of producing biocokes using biomass as a raw material, and particularly to a biocoke producing apparatus and process therefor, which enables industrial mass production of biocokes which can be used particularly as substitute fuel for coal cokes.

2. Description of the Related Art

In recent years, in view of global worming, reduction of CO2 emission is promoted. Especially, at combustion facilities like power boiler, fossil fuels such as coal and heavy oil are often used as fuel. However, these fossil fuels are a cause of global warming from a perspective of CO2 emission, and thus the use thereof is becoming more regulated in the view of protecting the global environment. Also from a perspective of fossil fuel drain, there is a need for developing a substitute energy source and putting the source into practical use.

The effort to promote utilization of fuel using biomass instead of coal cokes is being made. In this invention, biomass is an organic matter attributed to photosynthesis such as ligneous matters, grass plants, crops, and kitchen waste. By processing these types of biomass for fuel, it becomes possible to utilize biomass as an energy source or an industrial raw material.

The biomass can be transformed into fuel by drying the biomass to fuel or by pressurizing biomass to a fuel pellet, or by carbonization or destructive distillation. However, in the drying method, air ratio in the dried biomass remains large and apparent specific gravity is small, thus making it difficult to transport or store the fuel. This form of fuel is not very efficient for long distance transportation or storage.

The method to convert biomass into a fuel pellet is disclosed in Japanese Publication S61-27435. This method comprises adjusting moisture content of comminuted fibrous particles to about 16% to about 28% by weight, and compressing the material in a die to dry into the fuel pellet.

The method of destructive distillation is disclosed in JP2003-206490A. According to this method, in oxygen-depleted environment biomass is heated at 200 to 500° C., preferably 250 to 400° C., thus to produce a precursor of charred compact fuel of biomass.

However, according to the method disclosed in Japanese Publication S61-27435, biomass is processed to fuel by pressure-molding, processed fuel pallet contains too much moisture and heat value is low, which is insufficient as fuel.

Moreover, according to a destructive distillation method disclosed in JP2003-206490A and other references, processed biomass has more value than unprocessed biomass but in comparison to coal cokes, still apparent specific gravity is still small and has lower calorific value. It also has lower hardness compared to coal cokes, which is insufficient to substitute coal cokes.

SUMMARY OF THE INVENTION

The present invention has been made in view of such problems as described above, and it is an object of the present invention to provide a biocoke producing apparatus, and process therefor, which enables an efficient mass production of biocokes. In the biocoke producing apparatus and process therefore regarding the present invention, biomass used as a raw material, is an organic matter attributed to, photosynthesis such as ligneous matters, grass plants, crops, and kitchen waste.

Herein, biomass attributed to photosynthesis means all types of biomasses which is converted by photosynthesis in sunlight using water absorbed from roots and carbon dioxide in the air and forms organic matters such as sugar, cellulose and lignin.

Recently, as an alternative to coal cokes, recently bio-cokes are being studied. Biocokes are produced by maintaining the biomass raw material in the state of pressurization and heating for a given period of time and cooling. The pressurization and heating condition of pulverized biomass is set within the range inducing thermal decomposition of hemicellulose or thermal hardening of lignin within the pulverized biomass. In this way, reaction mechanism is established and biocoke with high hardness and high heat value is produced.

With the reaction mechanism under the above-identified condition, hemicellulose is thermally decomposed and develops adhesion effect, and superheated steam from the pulverized biomass induces lignin to react at a low temperature keeping its structure, which acts with consolidation effect synergistically, thereby producing bio-coke with high hardness and high heat value. The thermal hardening reaction makes progress as reaction activity spots are induced amongst phenolic macromolecules contained in lignin or the like.

Figure 7:
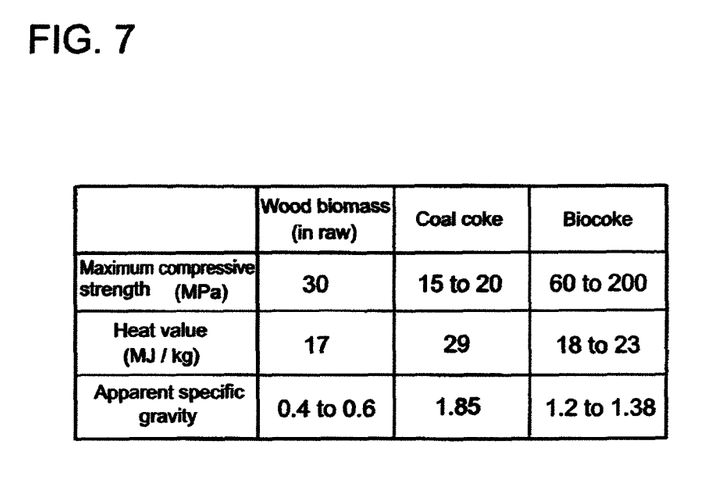
FIG. 7 is a table comparing physical properties of biocoke.

FIG. 7 is a table comparing physical properties of biocoke with those of other fuels. The values shown in the table were obtained in experiments, thus should not limit the present invention.

As shown in the table, properties of biocoke are apparent specific gravity 1.2 to 1.38, maximum compressive strength 60 to 200 MPa, heat value 18 to 23 MJ/kg, also showing excellence in hardness and combustibleness, while properties of wood biomass are apparent specific gravity 0.4 to 0.6, maximum compressive strength 30 MPa, heat value 17 MJ/kg, also showing inferior performance in hardness and combustibleness to biocoke. Properties of coal coke are apparent specific gravity 1.85, maximum compressive strength 15, heat value 29 MJ/kg but biocoke still shows superior performance in combustibleness and hardness.

Consequently, not only biocoke is a functional substitute of coal coke but also biocoke posses a high value as a material.

However, bio-cokes are still in the experiment stage and in reality the reaction containers are filled up with pulverized biomass manually and manufactured sequentially using one reaction container.

The present invention proposes A biocoke producing apparatus for producing biocokes using pulverized biomass raw material attributed to photosynthesis, by heating and pressure molding the pulverized biomass of which the moisture content is regulated to a given ratio, in reaction vessels in which a temperature range and a pressure range for inducing a pyrolytic of hemicellulose and thermal curing reaction of lignin are preset, the apparatus comprising:

a pressurization means for pressurizing to said pressure range;

a heating means for heating to said temperature range;

a cooling means for cooling after maintaining the state of pressurization and heating for a given period of time; and a discharging means for discharging produced biocokes after the cooling, wherein a plurality of said reaction vessels are provided, a pulverization delivery path for conveying the pulverized biomass is provided superior to the reaction vessels, each of said reaction vessels being connected to said pulverization delivery path via connection tubes, and said connection tubes are provided with pulverizate charging means for charging a given amount of pulverized biomass in accordance with a timing of pulverizate charging to the reaction vessels.

According to the present invention, biocokes which can be used to substitute for coal cokes, can be efficiently produced. Specifically, by providing a plurality of reaction vessels, thereby enabling sequential treatments and an industrial mass production of biocokes.

Moreover, with the configuration such that the pulverized biomass is conveyed by the pulverizate delivery path, and charged to multiple reaction vessels as needed, large supply units such as a pulverization unit and a pulverization hopper can be fixedly mounted, and the reaction vessels on a receiving side can be fixedly mounted as well without having to move, thereby simplifying and downsizing the units.

The present invention is also characterized in that at least two of reaction series having the multiple reaction vessels arranged linearly, and the pulverization delivery path is arranged linearly along the reaction series and the end thereof is connected to the adjacent series, thus to form a circulation circuit.

With the configuration, the multiple reaction vessels are arranged in a linear fashion, and along this, the pulverization delivery path is arranged in a linear fashion, thus an installation area can be smaller, which results in saving space.

Moreover, the pulverization delivery path is preferably a sealed-type pipe conveyor, and with this configuration, pulverizate, even in a form of fluid, can be surely conveyed, and as the conveyor is a sealed-type, pulverizate dispersal is prevented.

Furthermore, the biocoke producing apparatus is characterized in that the pulverizate charging means comprises an upper gate and a lower gate provided in different places in the vertical direction of the connection tube, opening and closing thereof being controlled by a control unit in accordance with the timing of pulverizate charging to the reaction vessels and position detection sensors arranged between said gates for detecting the amount of the pulverized biomass, wherein said opening and closing of said upper and lower gates are controlled in accordance with said detected amount of the pulverized biomass, and a charging amount and charging timing of the pulverized biomass into said reaction vessels are regulated.

With the configuration, the charging means for pulverized biomass is a double gate structure equipped with the position detection sensors, and is configured such that a charging amount of the pulverized biomass is regulated by controlling the opening and closing of the gates in accordance with the amount of the pulverized biomass detected by the position detection sensors. Thus, even with this simple configuration, a given amount of the pulverized biomass can be charged into the reaction vessels at a precise timing.

It is unique in that the pulverizate charging means comprises weight sensors arranged on a bottom of the reaction vessels, charging amount regulation means for regulation the charging amount of the pulverized biomass into the reaction vessel in accordance with the amount of the pulverized biomass detected by said weight sensors.

With the configuration that a charging amount of the pulverized biomass is regulated in accordance with the amount of the pulverized biomass detected by the position detection sensors. Thus, even with this simple configuration, a given amount of the pulverized biomass can be charged into the reaction vessels at a precise timing.

It is also characterized in that the reaction vessels(s) is a double-tube structure creating a cooling/heating media path between an inner tube and an outer tube, said pulverized biomass being charged into said inner tube, said cooling/heating media path is connected to each of a heating media circuit for raising the temperature of the heating media and a cooling media circuit equipped with a heat exchanger for cooling the cooling media with cooling water, and a cooling tank having enough capacity to cool the cooling media to the boiling point and below is provided in the upstream side of said heat exchanger of said cooling media circuit.

According to the present invention, boiling of the cooling water in the cooling-media heat exchanger is prevented, safe and smooth operation becomes possible and the minimum amount of the cooling water is needed for the operation.

As a process invention, process for producing biocokes using pulverized biomass raw material attributed to photosynthesis, by heating and pressure molding, in reaction vessels, the pulverized biomass of which the moisture content is regulated to a given ratio, wherein a plurality of said reaction vessels and a pulverizate delivery path for delivering said pulverized biomass are provided;

a temperature range and a pressure range for inducing a pyrolytic of hemicellulose and thermal curing reaction of lignin thereof are preset;

said process comprising steps of:

maintaining said pulverized biomass in each of said reaction vessels for a given period of time in a state of pressurization and heating in said pressure and temperature range;

cooling said pulverized biomass;

treating said pulverized biomass in a series of treatments for discharging produced biocokes; and charging a given amount of said pulverized biomass from said pulverizate delivery path to a corresponding one of said reaction vessels in accordance with a timing of pulverizate charging to the reaction vessels in said treating step.

According to this process, the same effects can be obtained as with the aforementioned apparatus invention.

Moreover, heating and pressurizing may be performed simultaneously, or one may start before the other. Specifically, the present invention includes all three cases of simultaneously starting both treatments an maintain the heated and pressurized state, and of starting pressurizing before heating and maintaining the state, and of starting heating before pressurizing and maintaining the state.

Furthermore, the biocoke producing process is characterized in that in the treating step, the heating is done by supplying heating media to said reaction vessels, and cooling is done by supplying cooling media, and at least said heating and cooling among the process steps in the multiple reaction vessels are performed at different timing in each of said reaction vessels.

In this manner, processing steps in the multiple reaction vessels are performed at different timing in each of the reaction vessels. By making the supply timing of the heat media or cooling media different in each of the reaction vessel, the load on the heating media circuit and cooling media circuit is reduced, downsizing the cooling/heating media circuit.

As described above, according to the present invention, it is possible to efficiently produce in large volume bio-cokes which has high hardness and heat value and can be used particularly as substitute fuel for coal cokes.

Moreover, with the configuration such that the pulverized biomass is conveyed by the pulverizate delivery path, and charged to multiple reaction vessels as needed, large supply units such as a pulverization unit and a pulverization hopper can be fixedly mounted, and the reaction vessels on a receiving side can be fixedly mounted as well without having to move, thereby simplifying and downsizing the units.

Furthermore, by configuring the pulverizate charging means with the double gate structure or the weight sensors, a simple structure can be achieved and a given amount of the pulverized biomass can be charged into the reaction vessels at a precise timing.

It is also configured such that the reaction vessels are heated and cooled by cooling/heating media and provided is the cooling media tank having enough capacity to cool the cooling media to the boiling temperature and below in the upstream of the cooling-media exchanger for supplying the cooling media, thereby preventing boiling of the cooling water in the cooling-media heat exchanger and achieving safe and smooth operation and minimizing the amount of the cooling water needed for the operation.

By making the supply timing of the heat media or cooling media different in each of the reaction vessel, the load on the heating media circuit and cooling media circuit is reduced, which enables the cooling/heating media circuit to be downsized.

DETAILED DESCRIPTION OF THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
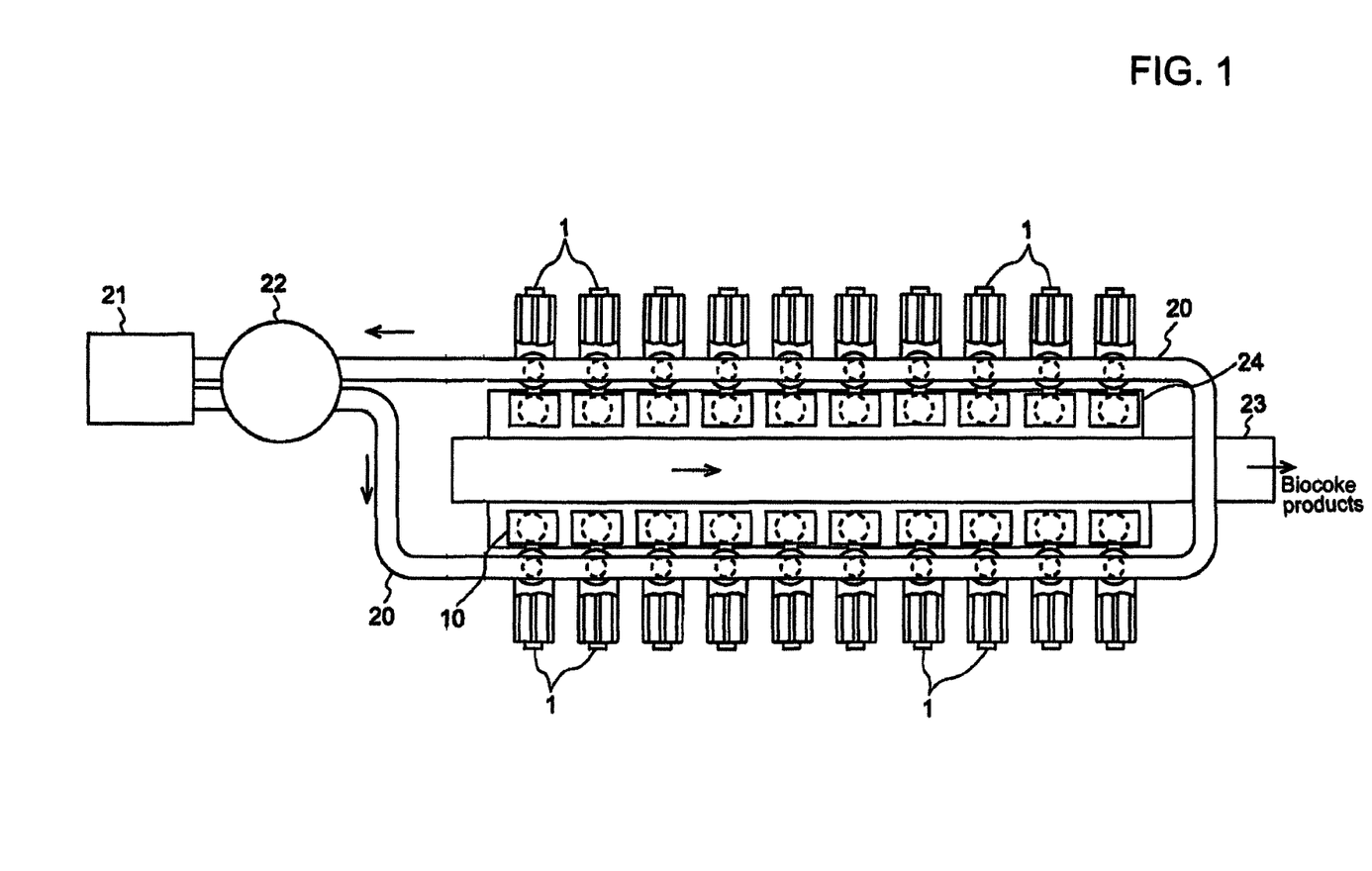
FIG. 1 is a plain view of a biocoke producing apparatus regarding an embodiment of the present invention.
Figure 2:
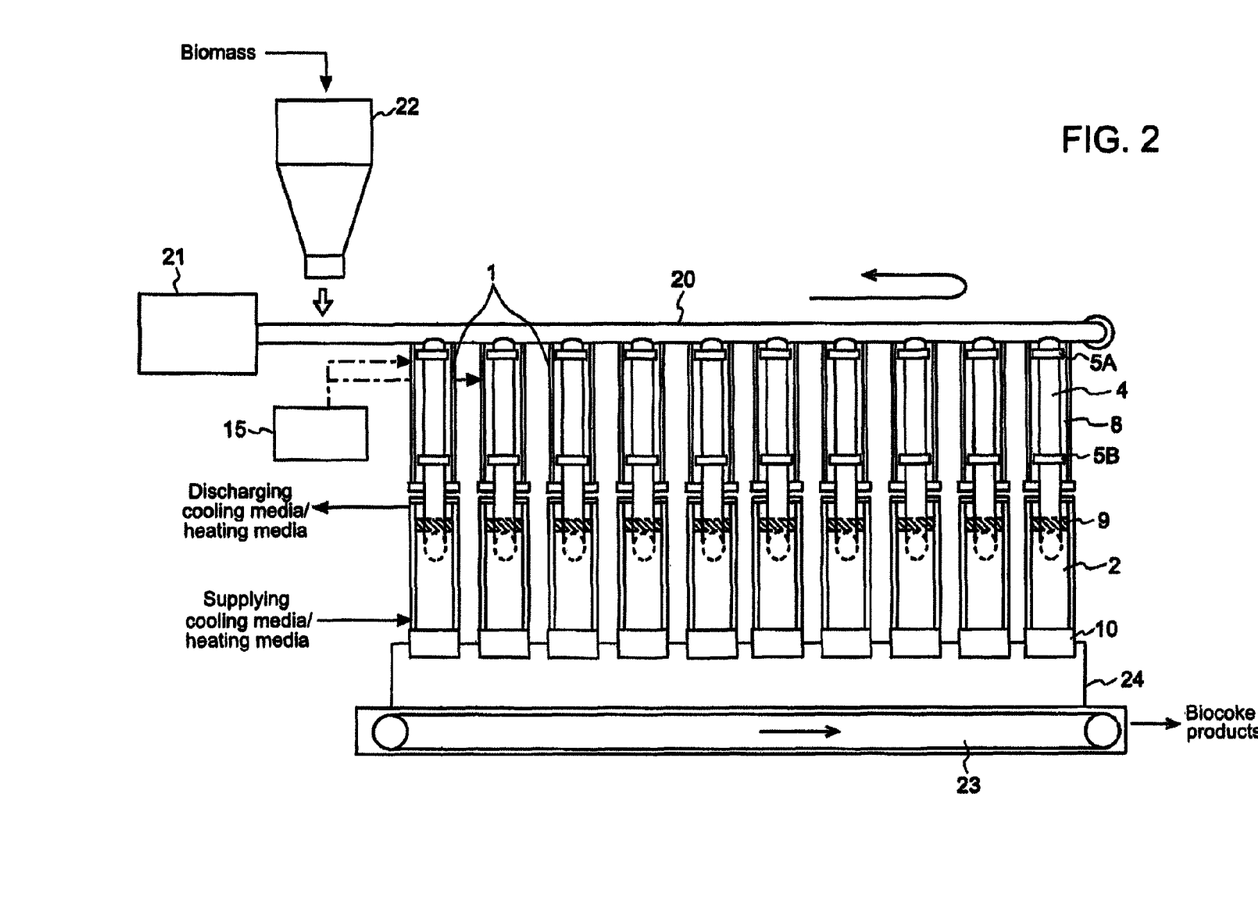
FIG. 2 is a sectional side view of the biocoke producing apparatus shown in FIG. 1.
Figure 3:
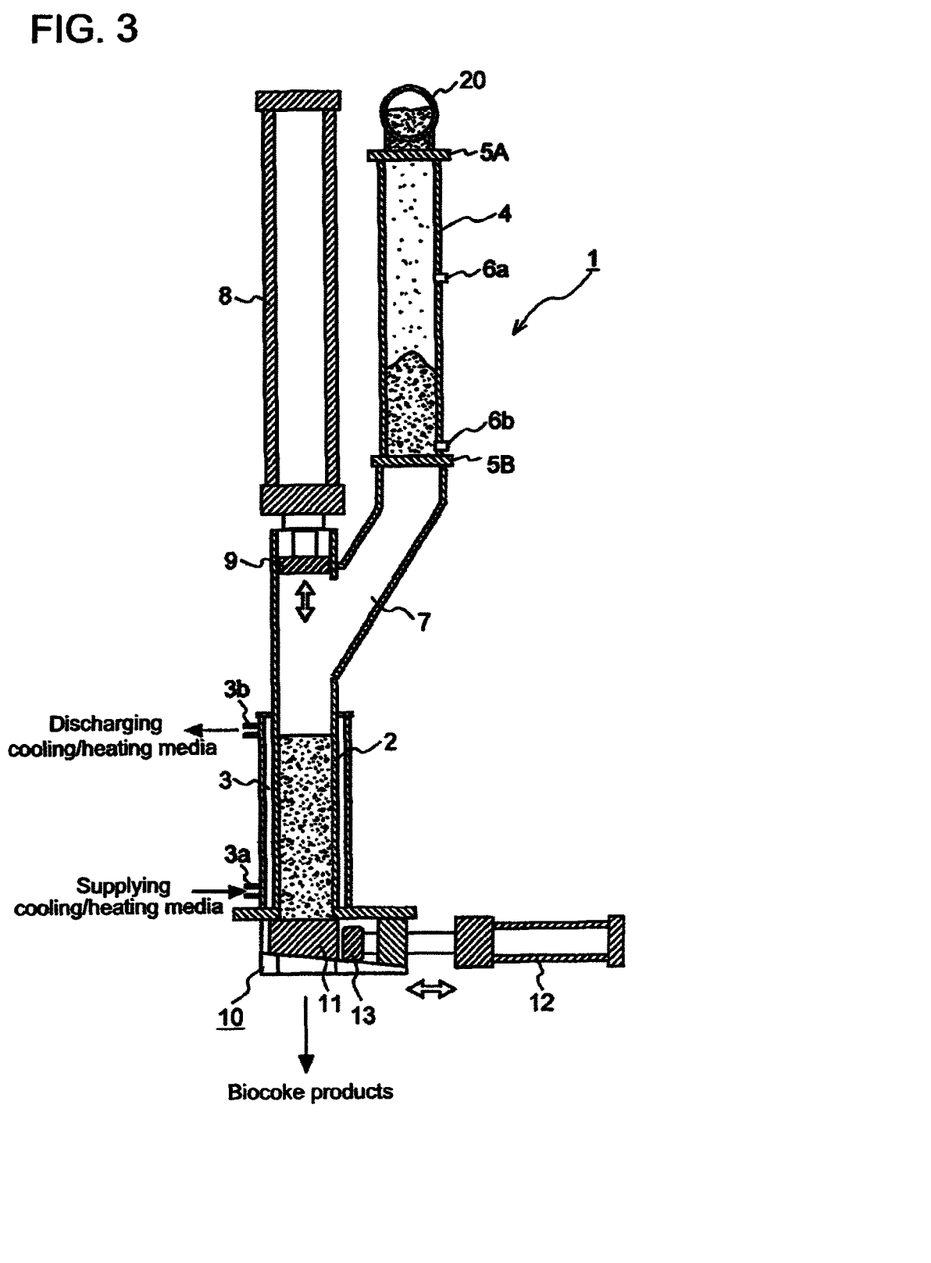
FIG. 3 is a perspective view showing a pulverizate traveling equipment of an embodiment.
Figure 4:
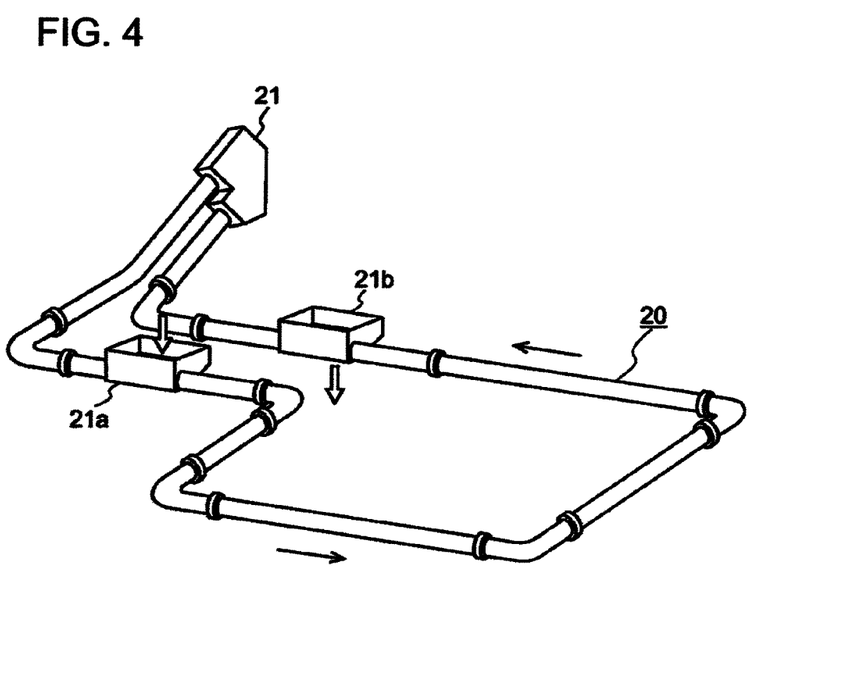
FIG. 4 is a figure showing an inner structure of the pulverizate traveling equipment of the embodiment.
Figure 5:
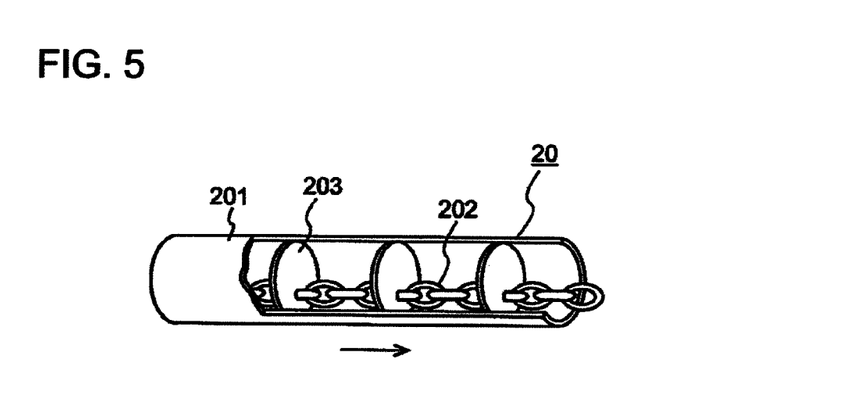
FIG. 5 is a sectional side view showing reaction vessels of the embodiment.
Figure 6:
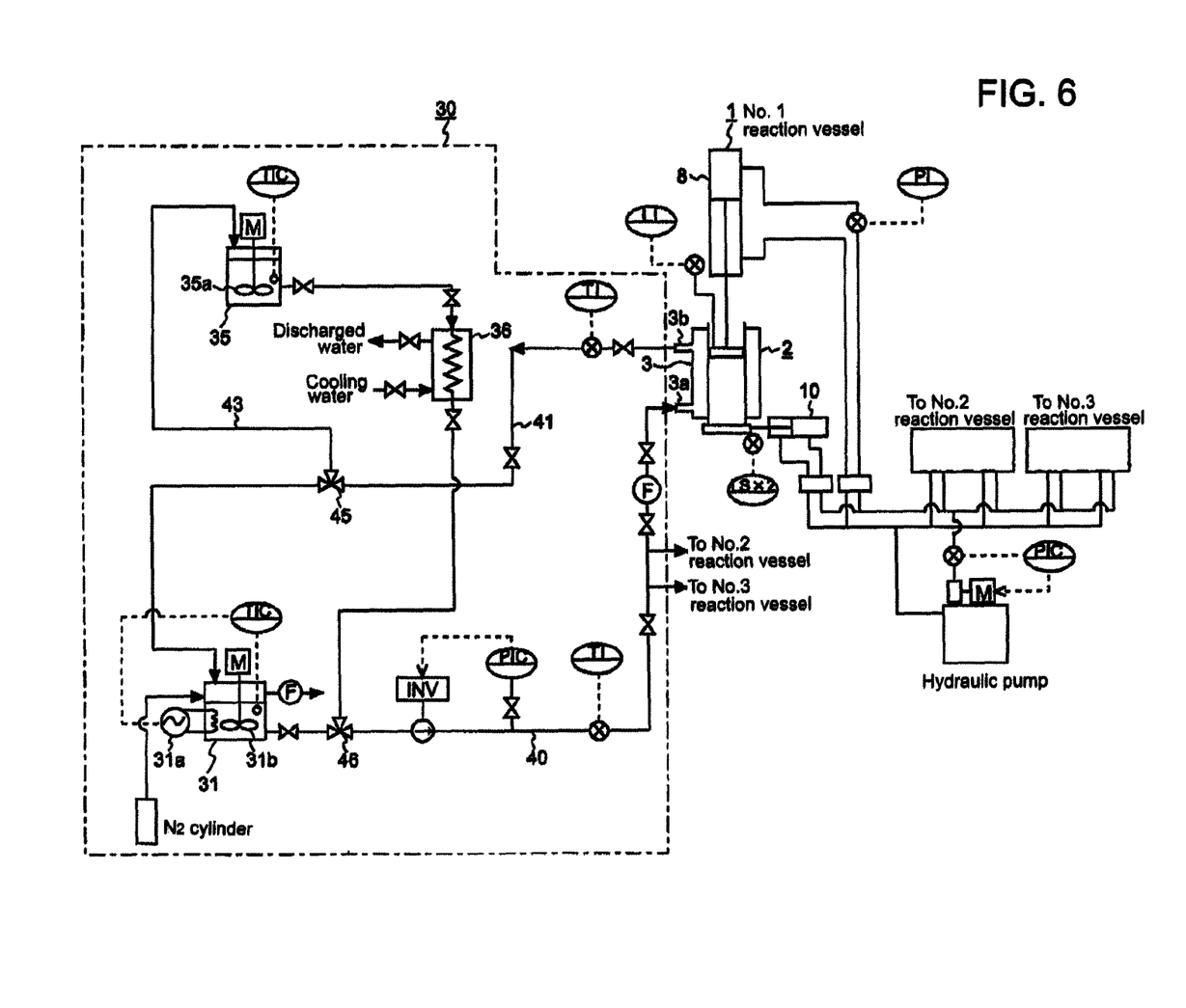
FIG. 6 is an equipment system diagram including a circuit of cooling/heating media of the embodiment.

FIG. 1 is a plain view of a biocoke producing apparatus regarding an embodiment of the present invention. FIG. 2 is a sectional side view of the biocoke producing apparatus shown in FIG. 1. FIG. 3 is a perspective view showing a pulverizate traveling equipment of an embodiment. FIG. 4 is a figure showing an inner structure of the pulverizate traveling equipment of the embodiment. FIG. 5 is a sectional side view showing reaction vessels of the embodiment. FIG. 6 is an equipment system diagram including a circuit of cooling/heating media of the embodiment.

In the present invention, biomass used as raw material for producing biocoke is organic matter attributed to photosynthesis. The biomass may be ligneous matters, grass plant, crops, agricultural matters, or the like. For example, there are instance, examples of biomass include lumber waste, thinned lumber, pruned branches, plants, agricultural waste and kitchen waste such as coffee grinds and used tea leaves.

Embodiment

In the embodiment, not only that moisture content of the biomass is adjusted but also that pulverized biomass is used as a raw material, which is biomass pre-treated by being pulverized to a predetermined particle diameter or smaller.

The biocoke producing apparatus of the present invention produces biomass by maintaining pulverized biomass for a certain period of time after pressurizing and heating the pulverized biomass under a predetermined condition of pressure and temperature, and then cooling the pulverized biomass, thereby producing biocokes. The above described condition for pressurizing and heating is set within a range that induces pyrolytic or thermal curing reaction of hemicellulose and lignin contained in the pulverized biomass. Specifically, pressure and temperature are set within the range that induces a pyrolytic of hemicellulose and a thermal curing reaction of lignin contained in the pulverized biomass.

In reference to FIG. 1 and FIG. 2, the overall configuration of the biocokes producing apparatus of the embodiment is explained.

The biocoke producing apparatus is mainly composed by reaction vessels 1, into which pulverized biomass is fed and the aforementioned reactions are performed so as to produce biocoke, a pulverization delivery conveyor 20 for conveying the pulverized biomass which is fed to the reaction vessel 1, a conveyor drive unit 21 for driving the pulverization delivery conveyor 20, a pulverizate hopper 22 for feeding the pulverized biomass, which is pre-treated, to the pulverization delivery conveyor 20, and a product conveyor 23 for conveying biocoke products discharged from the reaction vessels 1.

There are a plurality of the reaction vessels 1, and the pulverization delivery conveyor 20 located superior to the reaction vessels. In the embodiment, two of reaction series having the multiple reaction vessels 1 arranged linearly, are provided in parallel, and the pulverization delivery conveyor 20 is arranged linearly along the reaction series. Moreover, ends of the pulverization delivery conveyor 20 is connected to adjacent series forming a circuit, and the conveyor drive unit 21 drives the conveyor 20 in circle. And on one end side of the pulverization delivery conveyor 20, provided is the pulverizate hopper 22 for supplying and discharging the pulverized biomass of the conveyor 20.

In FIG. 4 and FIG. 5, a specific configuration of the pulverization delivery conveyor 20 is shown. In this example of the configuration, a conveyor of sealed pipe-type is used as the pulverization delivery conveyor 20.

FIG. 4 is a figure showing an inner structure of the conveyor of pipe-type. This conveyor 20 comprises a cylindrical casing 201, chain 202 penetrating through inside of the casing 201, a plurality of blades 203 fixed to the chain 202 and provided cross-sectionally and vertical to the axis of the casing 201 as if to penetrate inside of the casing 201. In driving the conveyor 20, the chain 202 is moved by means of the driving unit 21 and along with the movement, the blades 203 move. The pulverized biomass supplied between the blades 203 is transferred into the casing 201 as if to be pushed by the blades 203.

As shown in FIG. 4, the pulverization delivery conveyor 20 has a supply part 21a for pulverizate and a discharge part 21b for pulverizate provided in the location corresponding to the pulverizate hopper 22. A given amount of pulverized biomass is supplied into the conveyor at the supply part 21a from the pulverization hopper 22, and the remaining pulverized biomass in the conveyor is discharged at the discharge part 21b. By using the pulverization delivery conveyor with this configuration, pulverizate, even in a form of fluid, can be surely conveyed, and as the conveyor is a sealed-type, dispersal of purverizate is prevented.

Moreover, on the pulverization delivery conveyor 20, openings (not shown in the drawings) for charging the pulverized biomass into the reaction vessels 1, are provided in the location which corresponds to the reaction vessels 1, and each of the multiple reaction vessels 1 is connected via a connection tube 4 shown in FIG. 2 to the pulverization delivery conveyor 20.

In FIG. 6, a detailed configuration of the reaction vessels is shown. As shown in the drawing, the reaction vessel 1 is equipped with a cylindrical reaction cylinder 2 into which the pulverized biomass is fed, the reaction cylinder 2 and the pulverization delivery conveyor 20 are connected to the connection tube 4. The connection tube 4 is extendedly provided in the vertical direction, arranged off-centered from the central axis of the reaction cylinder, and a lower part of the connection tube 4 and an upper opening of the reaction cylinder 2 are connected with a connection part 7. The upper part of the connection tube 4 is connected to the pulverization delivery conveyor 20 which are extendedly provided in horizontal direction, the pulverized biomass which is conveyed within the pulverization delivery conveyor 20, is arbitrarily supplied into the connection tube 4.

Moreover, the connection tube 4 is equipped with a pulverizate charging means for charging a given amount of the pulverized biomass arbitrarily into the reaction cylinder 2. The pulverizate charging means comprises an upper gate 5A and a lower gate 5B provided in different places in the vertical direction of the connection tube 4, and position detection sensors 6a and 6b arranged between the gates.

The opening and closing of the aforementioned upper gate 5A and lower gate 5B, is controlled by a control unit not shown in the drawing. The position detection sensors 6a and 6b for detecting an amount of the pulverized biomass are provided between the upper gate 5A and the lower gate 5B. In the embodiment, two of these position detection sensors are provided in different positions in the vertical direction. However, as long as the number and location of the sensors enable detection of the amount of the pulverized biomass filled in between the gates, the structure is not limited to this.

The pulverizate charging means is configured to move in accordance with a timing of pulverizate charging to the reaction vessels 1. Specifically, prior to pressurizing and heating steps in the reaction cylinder 2, first the lower gate 5B is closed and the upper gate 5A is opened, and then the pulverized biomass is let fall from the pulverization delivery conveyor 20 onto the lower gate 5B. Once it is detected that the pulverizate biomass has accumulated up to the position detection sensor 6a located superior, the upper gate 5A is closed and the lower gate 5B is released. By doing this, a given amount of the pulverized biomass is charged into the reaction cylinder 2.

Moreover, while the reaction treatment is performed in the reaction cylinder 2, the pulverized biomass can be prepared in the connection tube 4 as a batch for the next reaction treatment by following the abovementioned process, and as soon as the reaction is completed in the cylinder and the biocoke is discharged, the lower gate 5B is released and the pulverized biomass is charged, thereby shortening the operation time.

Furthermore, as another pulverizate charging means, it is preferable to provide a weight sensor (not shown) on the bottom of the reaction vessel 1. In this case, in accordance with the weight of the pulverized biomass detected by the weight sensor, a charging amount of the pulverized biomass into the reaction vessel 1 is regulated. Regulation of the charging amount may be done by providing gate(s) between the connection tubes 4 and the pulverization delivery conveyor 20, then operating the opening and closing thereof.

A pressurization means for pressurizing the pulverized biomass within the cylinder 2 to a certain pressure is provided superior to the reaction cylinder 2. The pressurization means comprises a hydraulic cylinder 8 for pressurizing and a pressurization piston 9 reciprocated by the hydraulic cylinder 8. These parts are aligned concentrically with the reaction cylinder 2. The pressurization piston 9 is configured as to maintain the pressurized state for a certain period of time.

Moreover, the reaction cylinder 2 comprises a heating means for heating contents to a certain temperature, and a cooling means for cooling after the heating step. The heating means and cooling means may be one temperature regulating means. The embodiment proposes a double-tube structure as the temperature regulation means which provides jackets on the reaction cylinder 2. It is configured that a media path 3 for cooling and heating media is created between an inner tube and an outer tube. Through the media path 3, heating media or cooling media (herein after referred as cooling/heating media) are passed, and heating energy is given to the pulverized biomass filled in the inner tube of the cylinder by means of the cooling/heating media. Located below the media path 3 for cooling/heating media is an inlet 3a for cooling/heating media, and located superior thereto is an outlet 3b for cooling/heating media. The inlet 3a and outlet 3b for cooling/heating media are connected to a circuit of cooling/heating media which will be described hereinafter (see FIG. 6).

Furthermore, provided on the bottom of the reaction cylinder 2 is a discharge unit 10 for discharging contents. The discharge unit 10 is configured with a bottom lid 11 for sealing a bottom opening of the reaction cylinder 2, a extrusion piston 12 for moving the bottom lid 11 in the horizontal direction, and a hydraulic cylinder 13 for driving the extrusion piston. The discharge unit 10 is configured such that after the completion of the cooling step in the reaction cylinder 2, the extrusion piston 12 moves the bottom lid 11 and opens the bottom opening of the reaction cylinder so as to let the biocoke in the cylinder 2 fall to be discharged. When discharging the biocoke, the pressurization piston 9 may extrude the biocoke from above to let it fall.

The discharged biocokes are loaded on the product conveyor 23 shown in FIG. 1 and FIG. 2, and conveyed. The product conveyor 23 may be arranged directly below the reaction vessels 1, or as proposed in the embodiment, arranged between the two reaction series and the biocokes falling from the reaction vessels 1 may be guided onto the product conveyor 23 via slant planes 24.

The operation of the biocoke producing apparatus with above described configuration is explained including the operation method. The temperature, pressure, moisture content, size and others mentioned herein are mere preferable examples of the apparatus and should not be exclusive.

First, for pretreating the pulverized biomass as a raw material, moisture adjustment is performed by drying the biomass to the moisture content of 5 to 10%, and the dried biomass is pulverized to 3 mm or smaller in grain size, preferably 0.1 mm or smaller. Moreover, depending on types of biomass, moisture conditioning of the biomass may be performed after the drying and pulverizing steps. By doing so, it becomes possible to improve density in the reaction cylinder 2 achieving even filling when the reaction cylinder 2 is filled with the pulverized biomass. Thus, contact between pulverized biomass particles is enhanced in a thermal forming, thereby improving a hardness of the formed product.

Pulverized biomass is fed into the pulverizate hopper 22. The pulverized biomass stored in the hopper 22 is supplied arbitrarily to the pulverization delivery conveyor 20. The pulverized biomass is conveyed as circulating in the pulverization delivery conveyor 20.

Then, a given amount of the pulverized biomass is charged as needed from the pulverization delivery conveyor 20 into the reaction vessels 1 via the connection tube 4. Once the reaction cylinder 2 is filled with the pulverized biomass, the pressurization piston 9 is driven at the hydraulic cylinder 8 for pressurization so as to pressurize and compress the pulverized biomass within the reaction cylinder 2 to 8 to 25 MPa by the pressurization piston 9.

Simultaneously, the cooling/heating media are passed through the media path 3 for cooling/heating media in the reaction cylinder 2 so as to heat the pulverized biomass in the cylinder 2 to 115 to 230° C. In this process, heating and pressurizing are performed almost simultaneously so that the inside of the reaction cylinder may be heated in advance before pressurization, or may be pressurized first before heating.

The above temperature, pressure and moisture content are set in the range which induces pyrolytic or thermal curing reaction of hemicellulose and lignin contained in the pulverized biomass. In another word, it is the range which induces pyrolitic of hemnicellulose and thermal curing reaction of lignin within the pulverized biomass. The moisture content is set in the range which is sufficient enough to let moisture create a subcritical state in the cylinder.

The pulverized biomass within the reaction cylinder 2 maintains the state of the heating and pressurization for a certain period of time. For example, in a case of the cylinder diameter being 50 mm, the retention time is 10 to 20 minutes, and in a case of the cylinder diameter being 150 mm, the retention time is 30 to 60 minutes.

By performing the reaction under the aforementioned conditions, hemicellulose which is a component of pulverized biomass, is pyrolyzed, developing an adhesion effect; superheated steam developing inside the reaction vessel induces lignin to react at a low temperature while maintaining its framework, acting synergistically with a consolidation effect, thereby producing biocokes with high hardness and high calorific power. Thermal curing reaction progresses by the induction of reaction activity points amongst phenolic highmolecules contained in lignin or the like.

Once completing the reaction, the heating media are drawn out from the heating media path 3 of the reaction cylinder 2, and then the cooling media are drawn in. In the embodiment, silicon oil and steam are preferably used as heating media, and silicon oil, water or air is preferably used as cooling media. In the state of maintaining the pressurization within the cylinder 2, the biocoke is cooled to 50° C. and below, preferably 40° C. and below by the cooling media. Moreover, if biocokes are taken out at a temperature higher than the above identified temperature, the adhesion effect of hemicellulose decreases. Therefore, biocoke must be cooled before being discharged.

Moreover, after the cooling, the extrusion piston 12 is driven by the hydraulic cylinder 13 for discharging, and the bottom lid 11 of the reaction cylinder 2 is moved to release the bottom of the reaction cylinder 2, and the contents are extruded and discharged from above by the pressurization piston 9.

The discharged contents make biocoke products and the biocoke products are conveyed to the product conveyor 23 and retrieved.

With the biocoke producing apparatus and method thereof of the present invention, it becomes possible to efficiently produce biocokes with high hardness and high calorific power which can be used as a substitute for coal cokes. Furthermore, the biocoke produced according to the embodiment can be used as a heat source, reducing agent or the like in a cupola furnace or blast furnace for a casting manufacture or an iron manufacture, and can be used as a burning fuel such as a power boiler fuel and slaked lime, and also as a material utilizing the high compressive strength of the biocoke.

Basically, according to the embodiment, by providing multiple reaction vessels 1, continuous operation can be done, thus biocokes can be industrially produced at a large scale.

Moreover, by configuring such that the pulverized biomass is circulated by the pulverization delivery conveyor 20, and charged to the corresponding reaction vessels 1 as needed, large supply units such as a pulverization unit and the pulverization hopper 22, and multiple reaction vessels 1 at a receiving side can be fixedly mounted, and the units can be simplified.

Furthermore, the multiple reaction vessels 1 are closely arranged in a linear fashion, and along this, the pulverization delivery conveyor 20 is arranged in a linear fashion, thus an installation area can be smaller, which results in saving space.

The charging means for pulverized biomass is a double gate structure equipped with the position detection sensors 6a and 6b, and is configured such that a charging amount of the pulverized biomass is regulated by controlling the opening and closing of the gates in accordance with the amount of the pulverized biomass detected by the position detection sensors. Thus, even with this simple configuration, a given amount of the pulverized biomass can be charged into the reaction vessels 1 at a precise timing.

In a similar manner, the charging means may be configured such that the weight sensor mounted on the bottom of the reaction cylinder 2 detects the weight of the pulverizate and the charging amount is regulated in accordance with the detected weight. Thus, even with the simple configuration, a given amount of the pulverized biomass can be charged into the reaction vessels 1.

Moreover, in the embodiment, it is preferable to provide metal materials with high heat conductivity on at least one of the top and bottom of the reaction vessels 1. Specifically, metal materials with high heat conductivity are used for the pressurization piston 9 and/or the bottom lid 11. As the metal materials, copper and silver are preferably used. In this case, the materials with high heat conductivity are arranged to be in contact with the outer circumference of the reaction cylinders 2.

With this, if the diameter of the reaction vessel 1 is large, heat conduction from the outer jacket alone is not enough to transfer heat to inside.

Therefore, by using this configuration, heat energy is transferred not only from the outer circumference of the reaction cylinder but also from the top and bottom, thereby improving heat transfer efficiency, enhancing the reaction of the pulverized biomass and shortening the reaction time. Thus, the units can be downsized.

Next, in reference to FIG. 6, an example of the circuit of cooling/heating media of the embodiment will be explained below. In the biocoke producing apparatus of the embodiment, temperature regulation means equipped with switching means for switching between heating and cooling in the reaction cylinder 2, is an essential component. Accordingly, by providing the circuit of cooling/heating media as shown in FIG. 6, the temperature regulation means can have high heat conductivity and safety. In the embodiment, an example of using silicon oil for cooling and heating media is explained.

In the present embodiment, each of the inlet $3a$ and outlet $3b$ for cooling/heating media is connected to the cooling/heating media circuit 30. The cooling/heating media circuit 30 is a combined structure of a cooling media circuit and a heating media circuit. The inlet $3b$ for cooling/heating media is connected to a discharge line 42 for cooling/heating media, splitting into a heating-media return line 42 and a cooling-media return line 43 via a three-way valve 45 on the discharge line 41.

The heating-media return line 42 is connected to a heating-media tank 31. The heating-media tank has a heater $31a$ and an agitator $31b$ so as to raise the temperature of the cooled heating media. It is preferable that $N_2$ gas is supplied from $N_2$ cylinder as needed and inside of the tank is maintained in an inert atmosphere so as to ensure the safety. The discharge side of the heating-media tank 31 is connected via a three-way valve 46 to a cooling/heating media supply line 40.

With this configuration, the heating-media circuit formed by the heating media tank 31, the cooling/heating media supply line 40, the cooling/heating media path 3 (reaction cylinder 2), and the heating-media return line 42, is configured such that the heating media are circulated to the side of the heating media tank 31 by means of the three-way valves 45 and 46 during the heating of the reaction vessels 1.

The cooling-media return line 43 is connected to a cooling/heating media exchanger 36. The cooling media are cooled by heat exchange with cooling water such as clean water by the cooling/heating media exchanger 36.

Moreover, as a characteristic configuration of the present embodiment, a cooling-media tank 35 is provided in the upstream side of the cooling/heating media exchanger 36 on the cooling-media return line 43. The cooling-media tank 35 is capable of cooling lowering the temperature of the cooling media to at least the boiling point of the water and below, preferably 80° C. and below. In the embodiment, the cooling-media tank 35 has enough cubic capacity to cool to the above-mentioned temperature. It is also preferable that the cooling-media tank 35 is equipped with an agitator $35a$ thus to enhance the cooling capacity.

With this configuration, the cooling-media circuit formed by the cooling media tank 35, the cooling/heating media exchanger 36, the cooling/heating media supply line 40, the cooling/heating media path 3 (reaction cylinder 2), the cooling/heating media discharge line 41, and the cooling-media return line 43, is configured such that, when cooling the reaction vessels 1, the three-way valves 45, 46 are switched to the side of the cooling-media tank 35 so as to circulate the cooling media toward the cooling-media tank 35.

In the embodiment, since the heating temperature of the reaction cylinder 2 reaches 115 to 230° C., there is a possibility that cooling/heating media with high temperature are introduced to the cooling media exchanger 36 when switching between cooling and heating media, which causes the cooling water of the cooling media heat exchanger 36 to boil, causing problems such as a breakdown of the units. It is possible to configure the heating-media heat exchanger 36 such that the cooling water does not get boiled depending on a design condition of the heat exchanger 36. However, in that case, the flow rate of the cooling media needs to be increased or the pressurization is needed, thus it is not efficient.

Therefore, according to the embodiment, by providing the cooling media tank 35 capable of cooling the cooling media to the boiling temperature and below, preferably having enough capacity therefor, in the upstream of the cooling-media exchanger 36, boiling of the cooling water in the cooling-media heat exchanger 36 is prevented, safe and smooth operation becomes possible and the minimum amount of the cooling water is needed for the operation.

Moreover, in the embodiment, it is preferable that at least heating step and cooling step among the process steps in the multiple reaction vessels 1 are performed at different timing in each of the reaction vessels 1. Basically, when performing the heating step in one reaction vessel, the cooling step is performed in another reaction vessel.

By making the supply timing of the heat media or cooling media different in each of the reaction vessels, the load on the heating media circuit and cooling media circuit is reduced, making the cooling/heating media circuit smaller.

By the use of the biocoke producing apparatus and method therefor of the embodiment, it is possible to efficiently produce biocokes with high hardness and high calorific power which can be used to substitute a coal cokes. The biocoke produced according to the embodiment can be used as a heat source, reducing agent or the like in a cupola furnace or blast furnace for a casting manufacture or an iron manufacture, and also as a material utilizing the high compressive strength of the biocoke.

The invention claimed is:

1. A process for producing biocokes using pulverized biomass raw material attributed to photosynthesis, by heating and pressure molding, in reaction vessels, the pulverized biomass of which the moisture content is regulated to a given ratio,
    wherein a plurality of said reaction vessels and a pulverizate delivery path for delivering the pulverized biomass are provided, each of the reaction vessels being connected to the pulverization delivery path via connection tubes,
    wherein a temperature range and a pressure range for inducing a pyrolytic of hemicellulose and thermal curing reaction of lignin thereof are preset,
    said process comprising:
    maintaining the pulverized biomass in each of the reaction vessels for a predetermined period of time in a pressurization state and a heating state while in the pressure and temperature range;
    cooling the pulverized biomass;
    treating the pulverized biomass in a series of treatments for discharging produced biocokes from a bottom of the reaction vessels; and
    charging a predetermined amount of the pulverized biomass from the pulverizate delivery path via the connection tubes to a corresponding one of the reaction vessels in accordance with a timing of pulverizate charging to the reaction vessels in said treating by opening and closing gates in the connection tubes.

2. The process for producing biocokes according to claim 1, wherein in said treating, said heating is performed by supplying heating media to the reaction vessels, and said cooling is performed by supplying cooling media, and at least said heating and said cooling among the process in the plurality of reaction vessels are performed at different timing in each of the reaction vessels.

3. A biocoke producing apparatus for producing biocokes using pulverized biomass raw material attributed to photosynthesis, by heating and pressure molding the pulverized biomass of which the moisture content is regulated to a given ratio, in reaction vessels in which a temperature range and a pressure range for inducing a pyrolytic of hemicellulose and thermal curing reaction of lignin are preset, said apparatus comprising:

a pressurization device configured to pressurize the pulverized biomass within the pressure range;

a heating device configured to heat the pulverized biomass within the temperature range;

a cooling device configured to cool the pulverized biomass after the pulverized biomass is maintained within the pressure range and the temperature range for a predetermined period of time;

a discharging device configured to discharge produced biocokes after cooling;

a plurality of reaction vessels; and a pulverization delivery path configured and arranged to convey the pulverized biomass, and being disposed superiorly to said plurality of reaction vessels, wherein each reaction vessel of said plurality of reaction vessels is connected to said pulverization delivery path via a connection tube, gates are disposed in said connection tubes, and each said connection tube has a pulverizate charging device configured to charge a predetermined amount of the pulverized biomass from said pulverization delivery path via said connection tube to said reaction vessel in accordance with a timing of the pulverizate charging to the said reaction vessel by opening and closing said gates, wherein each said pulverizate charging device comprises an upper gate and a lower gate as said gates, said upper gate being disposed in a different place in the vertical direction of said connection tube from said lower gate, said upper and lower gates being configured to be controlled so as to open and close by a control unit in accordance with the timing of the pulverizate charging to said plurality of reaction vessels, and position detection sensors arranged between said upper and lower gates and being configured to detect the amount of the pulverized biomass, wherein said control unit is configured to control the opening and closing of said upper and lower gates in accordance with the detected amount of the pulverized biomass, and configured to regulate a charging amount and charging timing of the pulverized biomass into said plurality of reaction vessels, wherein each said reaction vessel of said plurality of reaction vessels is a double-rube structure forming a cooling/heating media path between an inner tube and an outer tube, said inner tube being configured to enable the pulverized biomass to be charged thereinto, wherein said cooling/heating media path is connected to each of a heating media circuit configured to raise the temperature of a heating media and a cooling media circuit equipped with a heat exchanger configured to cool a cooling media with cooling water, and wherein said discharging device comprises a discharge unit disposed at a bottom of each said reaction vessel of said plurality of reaction vessels.

4. The biocoke producing apparatus according to claim 3, further comprising at least two reaction series having said plurality of reaction vessels arranged linearly, and said pulverization delivery path is arranged linearly along one reaction series and an end thereof is connected to an adjacent reaction series, thereby forming a circulation circuit.

5. The biocoke producing apparatus according to claim 3, further comprising a cooling tank having sufficient capacity to cool the cooling media to the boiling point and below disposed in an upstream side of said heat exchanger of said cooling media circuit.

6. A biocoke producing apparatus for producing biocokes using pulverized biomass raw material attributed to photosynthesis, by heating and pressure molding the pulverized biomass of which the moisture content is regulated to a given ratio, in reaction vessels in which a temperature range and a pressure range for inducing a pyrolytic of hemicellulose and thermal curing reaction of lignin are preset, said apparatus comprising:

a pressurization device configured to pressurize the pulverized biomass within the pressure range;

a heating device configured to heat the pulverized biomass within the temperature range;

a cooling device configured cool the pulverized biomass after the pulverized biomass is maintained within the pressure range and the temperature range for a predetermined period of time;

a discharging device configured to discharge produced biocokes after cooling, a plurality of reaction vessels; and a pulverization delivery path configured and arranged to convey the pulverized biomass, and being disposed superiorly to said reaction vessels, wherein each reaction vessel of said plurality of reaction vessels is connected to said pulverization delivery path via a connection tube, gates are disposed in said connection tubes, and each said connection tube has a pulverizate charging device configured to charge a predetermined amount of the pulverized biomass from said pulverization delivery path via said connection tube to said reaction vessel in accordance with a timing of the pulverizate charging to said reaction vessel by opening and closing said gates, wherein each said pulverizate charging device comprises said gates, and weight sensors arranged on a bottom of said reaction vessel, wherein said pulverizate charging device is configured to charge the amount of the pulverized biomass into said reaction vessel in accordance with the amount of the pulverized biomass detected by said weight sensors, wherein each said reaction vessel of said plurality of reaction vessels is a double-tube structure forming a cooling/heating media path between an inner tube and an outer tube, said inner tube being configured to enable the pulverized biomass to be charged thereinto, wherein said cooling/heating media path is connected to each of a heating media circuit configured to raise the temperature of a heating media and a cooling media circuit equipped with a heat exchanger configured to cool the cooling media with cooling water, and wherein said discharging device comprises a discharge unit disposed at a bottom of each said reaction vessel of said plurality of reaction vessels.

7. The biocoke producing apparatus according to claim 6, further comprising at least two reaction series having said plurality of reaction vessels arranged linearly, and said pulverization delivery path is arranged linearly along one reaction series and an end thereof is connected to an adjacent reaction series, thereby forming a circulation circuit.

8. The biocoke producing apparatus according to claim 6, further comprising
a cooling tank having sufficient capacity to cool the cooling media to the boiling point and below disposed in an upstream side of said heat exchanger of said cooling media circuit.

* * * * *